(12) United States Patent
Olsen et al.

(10) Patent No.: US 6,379,838 B1
(45) Date of Patent: Apr. 30, 2002

(54) CELL PACKAGE

(75) Inventors: Ib Ingemann Olsen; Eric Michel Pasquier, both of Hickory, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/291,212

(22) Filed: Apr. 14, 1999

(51) Int. Cl.$^7$ ............................................. H01M 2/02
(52) U.S. Cl. ........................................................ 429/163
(58) Field of Search .................................. 429/127, 162, 429/163, 99, 100, 176; 29/623.1, 623.2, 623.4

(56) References Cited

U.S. PATENT DOCUMENTS

| | | |
|---|---|---|
| 3,865,631 A | 2/1975 | Clayman |
| 3,990,917 A | 11/1976 | Clayman |
| 4,031,296 A | 6/1977 | Sarbacher et al. |
| 4,326,015 A | 4/1982 | Kohler |
| 4,477,543 A | 10/1984 | Bjorklund |
| 4,588,662 A | 5/1986 | McManis, III et al. |
| 4,628,014 A | 12/1986 | Hruden |
| 4,800,141 A | 1/1989 | Eppley et al. |
| 4,803,135 A | 2/1989 | Garoutte |
| 4,861,686 A | 8/1989 | Snyder |
| 4,968,567 A | 11/1990 | Schisselbauer |
| 4,997,732 A | 3/1991 | Austin et al. |
| 4,999,263 A | 3/1991 | Kabata et al. |
| 5,201,924 A | 4/1993 | Mix et al. |
| 5,512,160 A | 4/1996 | Lim |
| 5,580,677 A | 12/1996 | Morishita et al. |
| 5,641,591 A | 6/1997 | Kawakami et al. |
| 5,693,105 A | 12/1997 | Kawakami |
| 5,695,530 A | 12/1997 | Hong et al. |

FOREIGN PATENT DOCUMENTS

| | | | |
|---|---|---|---|
| EP | 0 397 248 | 5/1990 | ............ H01M/2/02 |
| EP | 0 390 557 B1 | 8/1997 | |
| EP | 0 845 821 | 6/1998 | ............ H01M/2/02 |
| EP | 0 973 212 | 1/2000 | ............ H01M/2/06 |
| JP | 61-171061 | 8/1986 | ............ H01M/2/36 |
| JP | 63-48778 | 3/1988 | ......... H01M/10/40 |
| JP | 63-86273 | 4/1988 | ......... H01M/10/12 |
| JP | 2-86057 | 3/1990 | ............ H01M/2/36 |
| JP | 10-208778 | 8/1998 | ......... H01M/10/40 |
| WO | WO 98/42036 | 9/1998 | ............ H01M/2/06 |

*Primary Examiner*—Gabrielle Brouillette
*Assistant Examiner*—Susy Tsang
(74) *Attorney, Agent, or Firm*—Sughrue Mion, PLLC (57) ABSTRACT

A cell package is made of a laminate which can be heat sealed even when the cell package is contaminated with electrolyte. The laminate includes a polyester outer layer, an aluminum barrier layer and a polypropylene inner layer which are adhered together by an adhesive which does not break down in the presence of electrolyte.

7 Claims, 8 Drawing Sheets

CELL PACKAGE

BACKGROUND OF THE INVENTION

1. Field of the Invention

The present invention relates to a method of fabricating an electrochemical battery and, more particularly, to a method of injecting the electrolyte into the cell stack of the battery by first placing the electrolyte in a sealed pouch that is placed together with the cell stack into a cell package. The invention also relates to a cell package which can be heat sealed even after it has been contaminated during the process of introducing the electrolyte into the cell stack.

2. Background

A important consideration in the manufacturing of electrochemical batteries is the manner in which the electrolyte is introduced into the cell stack. A current technique includes the steps of pouring the electrolyte into the cell stack during the manufacturing of the cell stack in a machine, placing the electrolyte impregnated cell stack into the cell package, evacuating the cell package and heat sealing the package.

This technique suffers from many disadvantages. The first problem is the loss of electrolyte during the step of pouring the electrolyte into the cell stack and the subsequent step of evacuating the package. It is estimated that between 10 and 30% of the electrolyte is lost during these steps. The electrolyte is a relatively expensive component of the electrochemical cell. Thus, the loss of electrolyte increases the overall cost of manufacturing the battery. Further, since the amount of lost electrolyte cannot be gauged, the final volume of electrolyte that remains in the cell stack is unknown.

A second problem is that the electrolyte that is naturally suctioned from the cell stack during the evacuating step contaminates the inside of the package. Such contamination of the package makes it difficult to securely seal the package. As such, subsequent leakage of the electrolyte from the sealed package may result. A further problem is that the pouring step must be performed in a glove box environment (i.e., dry and inert atmosphere). Since this step is an intermediate step in the manufacturing of the cell stack, the machine which manufactures the cell stack must consequently have a glove box environment, thus driving up the cost of the machine. In addition, when the electrolyte is poured into the cell stack, the electrolyte contaminates the machine thus requiring that it be cleaned on a regular basis. In addition, the vacuum that is applied to the cell stack during the evacuating step may change the solvent ratio of the impregnated electrolyte.

The current cell package is formed of a laminate of a polyester outer layer, an aluminum barrier layer and a polyethylene acrylic acid (EAA) inner layer. The polyester layer provides, strength, the aluminum layer prevents water from penetrating the cell package and the inner layer allows for the heat sealing of the cell package. Specifically, generally, the cell package includes two parts that are bonded together around their periphery by heating sealing the EAA inner layers to each other. The problem with this laminate is that once contaminated with electrolyte, the EAA inner layers cannot form a secure heat seal. This makes degassing and resealing of the cell package a problem. Also, the current material has a relatively high permeability to water necessitating the use of wider heat sealing areas in order to ensure a long shelf life. Finally, the current laminate will absorb electrolyte at elevated temperatures which can interact with the adhesive layer between the EAA inner layer and the aluminum barrier layer.

SUMMARY OF THE INVENTION

It is an object of the invention to provide a method of manufacturing an electrochemical battery which overcomes the above problems. In particular, an object of the invention is to provide a method of manufacturing a battery where the electrolyte is introduced into the cell stack with minimal or no loss of electrolyte. Another object of the invention is to provide a method in which the electrolyte filling step is performed after the cell stack is manufactured so that the cell stack manufacturing machine does not have to maintain a glove box environment and contamination of the machine is eliminated.

These and other objects are achieved by a method of fabricating an electrochemical battery, comprising the steps of separately forming an electrode cell stack and a sealed electrolyte pouch, placing the cell stack and the electrolyte pouch together into a cell package, applying a vacuum to the cell package, sealing the cell package, and rupturing the pouch to release the electrolyte into the cell stack. The rupturing step includes the step of squeezing the pouch until the electrolyte squirts out of the pouch. Further, the sealing step includes the step of heat sealing the cell package.

With this fabrication technique there is no electrolyte loss. In particular, since the electrolyte is injected into the electrode cell stack after the package has been sealed, substantially all of the electrolyte is suctioned into the electrode cell stack without any of the electrolyte escaping from the package. In addition, since the electrolyte is not poured into the cell stack during the manufacturing of the cell stack, the cell manufacturing machine does not have to provide a glove box environment. Also, contamination of the machine is avoided. Accordingly, all of the disadvantages discussed above with respect to the current technique are overcome.

Another aspect of the invention is to form the cell package so that it includes two separate enclosures with a tube extending between the two enclosures such that they communicate with each other through the tube. The cell stack is placed in a first one of the enclosures which is then evacuated. The sealed electrolyte pouch is placed in the second enclosure which is also evacuated after the pouch is inserted. Thereafter, as with the previous embodiment, the pouch is ruptured to release the electrolyte from the pouch such that it flows through the tube and into the cell stack contained in the first enclosure. The tube is then sealed and the second enclosure is removed.

Also, with this technique, after formation it is possible to degas the first enclosure. The formation is naturally done after the electrolyte has been released into the cell stack. The degassing step is performed by puncturing the second enclosure and applying a vacuum thereto so that the first enclosure is degassed via the tube. The tube is then sealed and the second enclosure is removed.

It is a further object of the invention to provide a cell package made of a laminate which can be heat sealed even when the cell package is contaminated with electrolyte. This is achieved by a laminate which includes a polyester outer layer, an aluminum barrier layer and a polypropylene inner layer which are adhered together using a unique adhesive which does not break down when contaminated with electrolyte. It has been discovered that the polypropylene layers associated with the overlapped portions of the cell package can be securely heat sealed to each other even when contaminated with electrolyte.

BRIEF DESCRIPTION OF THE DRAWINGS

The above and other objects, features and advantages of the present invention will be better understood from the following specification when read in conjunction with the accompanying drawings in which.

DETAILED DESCRIPTION OF THE INVENTION

Referring to FIGS. 1–4, according to a first embodiment of the invention, an electrolyte 8 is first introduced into a pouch and the pouch is evacuated and sealed. The sealed pouch is then placed along with a pre-manufactured cell stack 12 inside a cell package 14 which is then evacuated and sealed. Thereafter, the sealed pouch 10 is ruptured so that the electrolyte is released from the open end 16 of the pouch and impregnated inside the cell stack 12.

Figure 1:
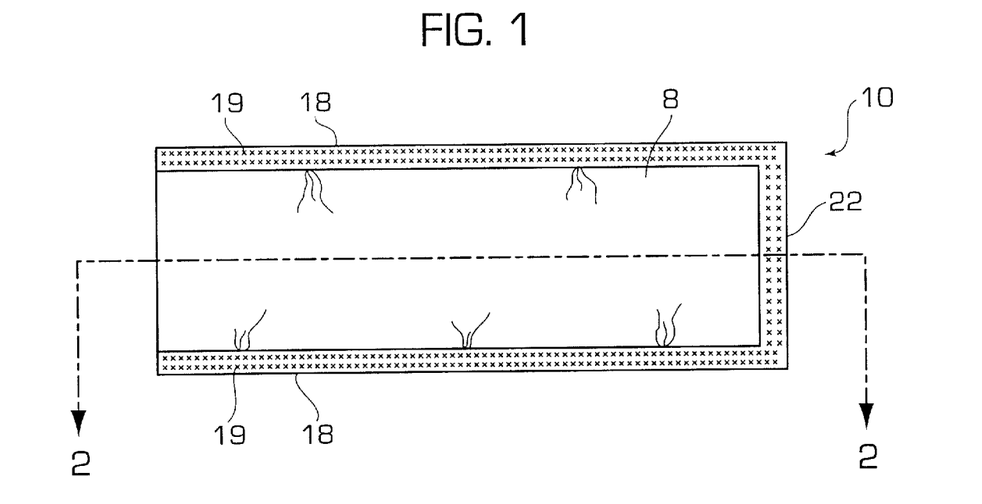
FIG. 1 is a plan view showing the pouch filled with electrolyte according to a first embodiment of the invention.
Figure 2:
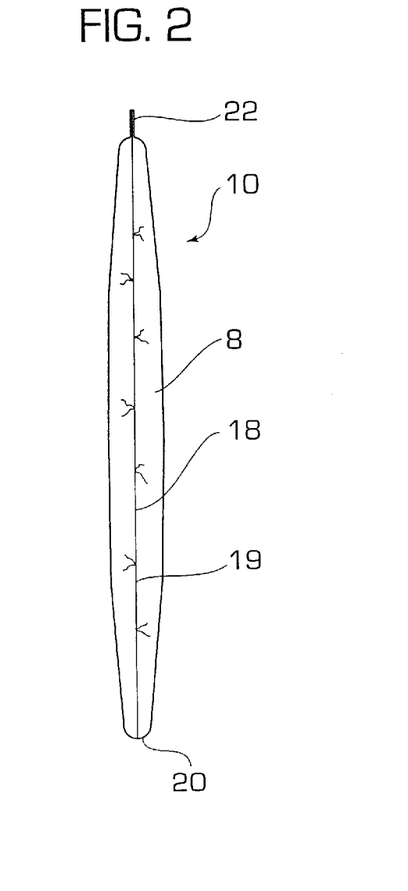
FIG. 2 is a sectional view taken along line 2—2 of FIG. 1 showing the electrolyte pouch.

In more detail, the electrolyte pouch is illustrated in FIGS. 1 and 2. The pouch is made of a polyethylene film or the like having, for example, a thickness of 50$\mu$, and is formed by folding the film in half and heat sealing the two longitudinal sides 18 to form heat sealed seams 19. The bottom end 20 of the pouch is closed by virtue of the fold while the top end of the pouch 22 is initially open (FIG. 1 shows the pouch after the electrolyte has been inserted and the pouch completely sealed). There are, of course, alternative techniques for forming the pouch. For example, the pouch can be formed by folding the film along the length of the film and heat sealing the longitudinal side opposite the fold and the bottom. Also, the pouch can be formed so it is seamless with an open top. Alternatively, the pouch can be formed of two separate sheets which are heat sealed together.

The next step is to fill the pouch with a predetermined amount of electrolyte. This step is preferably conducted in a glove box having a dry and inert atmosphere and using a dropper. After the pouch is filled, the top 22 of the pouch 10 is heat sealed in a condition that there are no air bubbles inside the pouch. One technique to accomplish this is to seal the pouch just below the top level of the electrolyte, although the invention is no so limited. This ensures that all of the air is removed from the pouch prior to sealing. After the top 22 of the pouch 10 is heat sealed, the excess portion of the pouch (i.e., above the seal) is removed by cutting the pouch just above the seal. Thereafter, the top edge is cleaned to remove the electrolyte on the outside of the pouch so as to avoid subsequent contamination. The electrolyte pouch is now ready to be inserted into the cell package 14.

Figure 3:
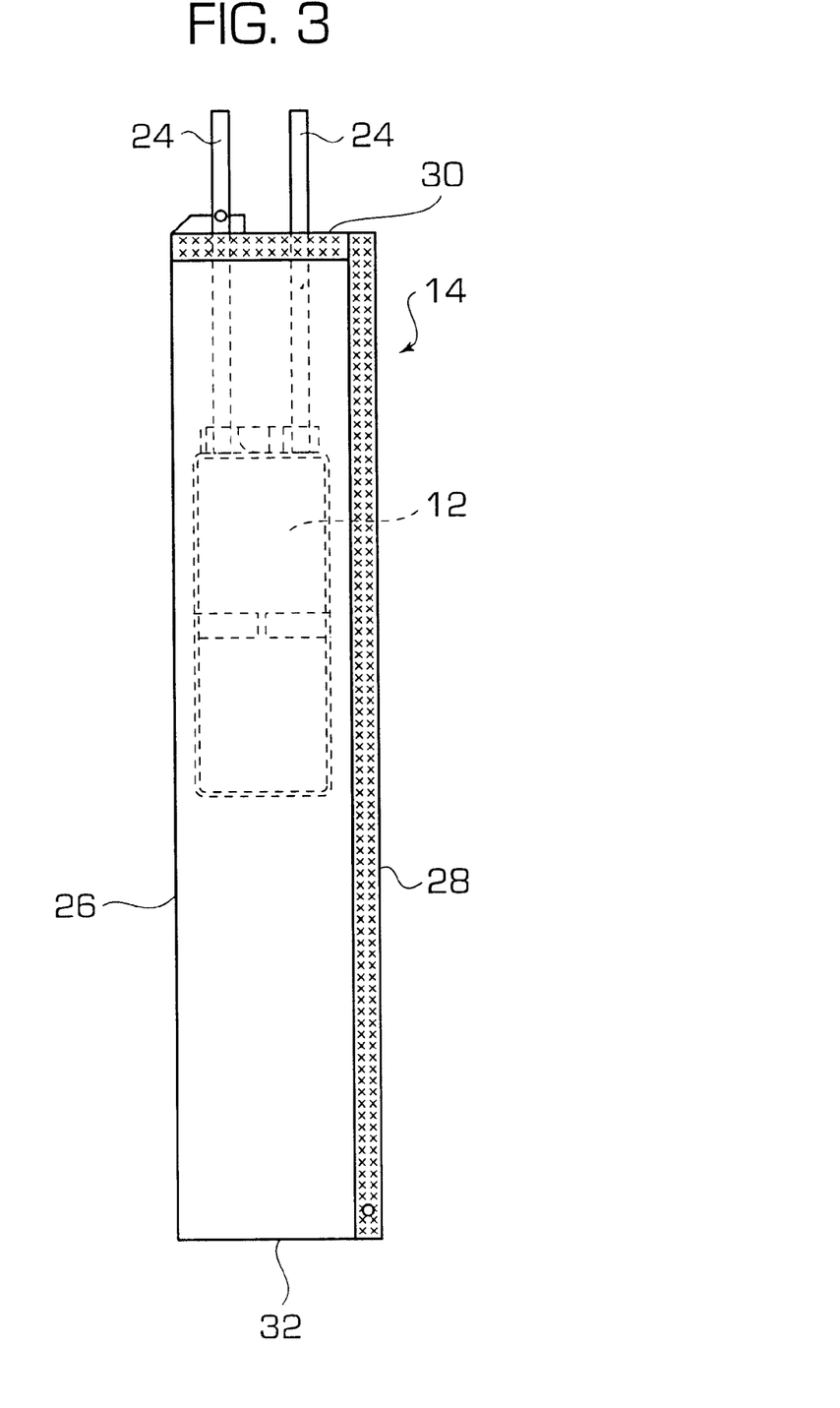
FIG. 3 is a plan view showing the partially sealed cell package with cell stack located therein, according to the embodiment of FIG. 1.
Figure 11:
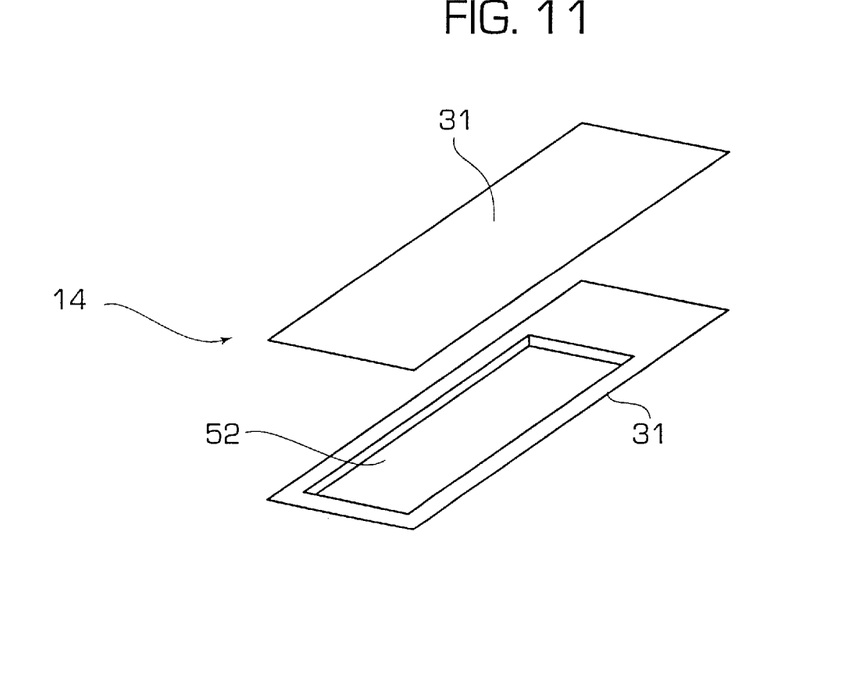
FIG. 11 is a perspective view showing the preferred construction of the cell package.

Referring to FIG. 3, the cell stack 12 is positioned inside the cell package 14 with its leads 24 extending outside the package 14. Like the pouch, the package can be formed by folding the film in either the longitudinal or transverse direction and heat sealing two of the remaining three sides to leave one end open. Since the leads must be accessible from the exterior of the cell package, the cell package should be folded and heat sealed around the cell stack. In the illustrated embodiment, the cell package has been formed by folding the film along a longitudinal side 26 to cover the cell stack and thereafter heat sealing the opposite longitudinal side 28 and the top end 30 around the leads 24. This leaves the bottom end 32 of the cell package open. Alternatively, the cell package can be formed from two separate sheets 31 which are heat sealed together, as shown in FIG. 11, and discussed in greater detail below.

Figure 4:
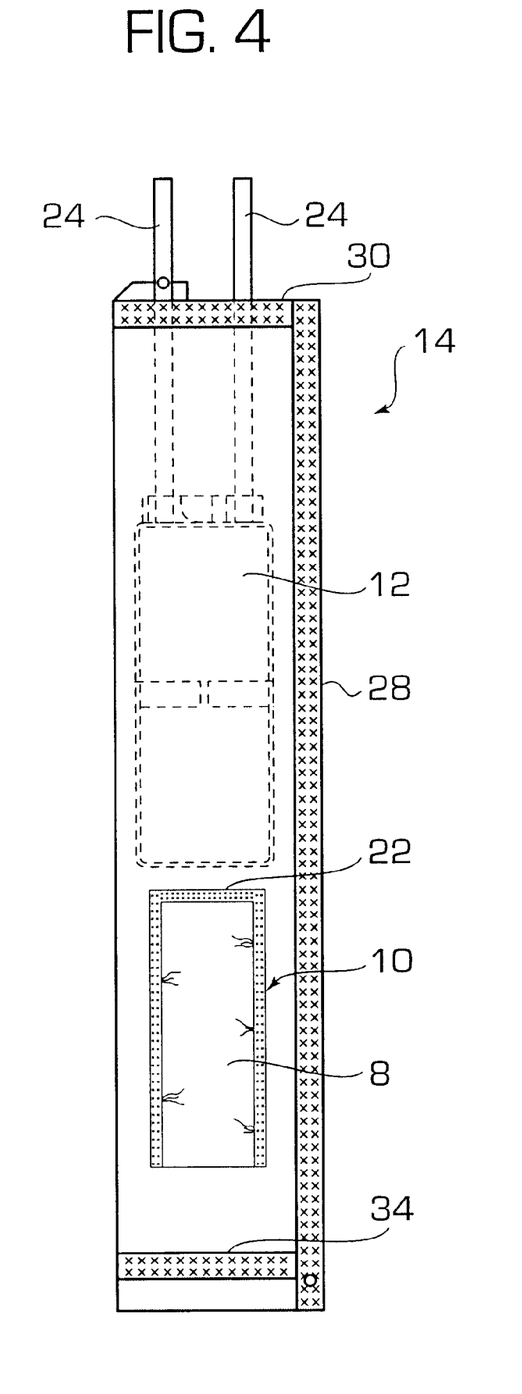
FIG. 4 is a plan view showing the completely sealed cell package with both the cell stack and the electrolyte pouch contained therein, according to the embodiment of FIG. 1.

Referring to FIG. 4, after the cell package 14 has been formed, the pouch is inserted into the cell package 14 through the open bottom end 32. It is preferred that the pouch be positioned so that a sealed end (e.g., the top end 22) of the pouch is closest to the cell stack, as shown. The cell package 14 is then evacuated and the open bottom end 32 of the package 14 is heat sealed, as designated by reference numeral 34. This results in an evacuated cell package 14 with the cell stack 12 and the electrolyte pouch located inside.

Figure 5:
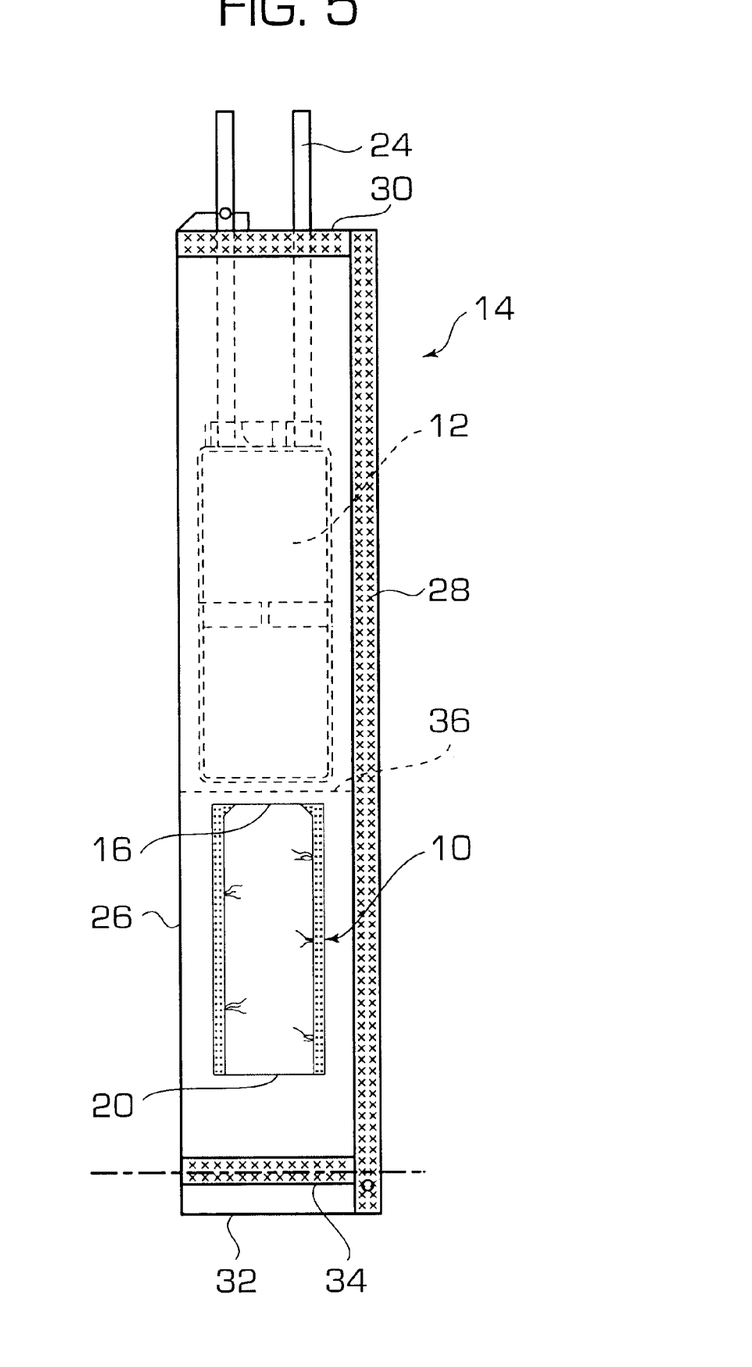
FIG. 5 is a plan view showing the cell package after the electrolyte package has been ruptured and the electrolyte released inside the cell stack, according to the embodiment of FIG. 1.

Referring to FIG. 5, the pouch is then ruptured to release the electrolyte from the pouch. Since the cell package 14 is evacuated, the released electrolyte is suctioned inside the cell package to activate the cell stack 12. A preferred technique for rupturing the pouch is to apply a sufficient pressure to the pouch to burst the pouch. It is important that the technique used for rupturing the cell does not rupture the package. In the illustrated embodiment, the top, heat sealed, end 22 of the pouch, closest to the cell stack, is ruptured. This is achieved by rolling a roller (not shown) along the pouch starting from the bottom end 20 and proceeding toward the top end 22 or by applying a mechanical shock to the pouch.

After the cell stack is impregnated with the electrolyte, it is desirable to keep the cell stack in the cell package, instead of transferring the cell stack to another uncontaminated cell package, although the invention is not limited in this respect. This can be done by heat sealing the cell package along seam line 36 extend transversely between the cell stack 12 and the electrolyte pouch 10. This involves heat sealing the cell package when it is contaminated with electrolyte. The preferred cell package material is discussed below, although it is understood that the invention is not limited to the particular type of cell package material.

Figure 6:
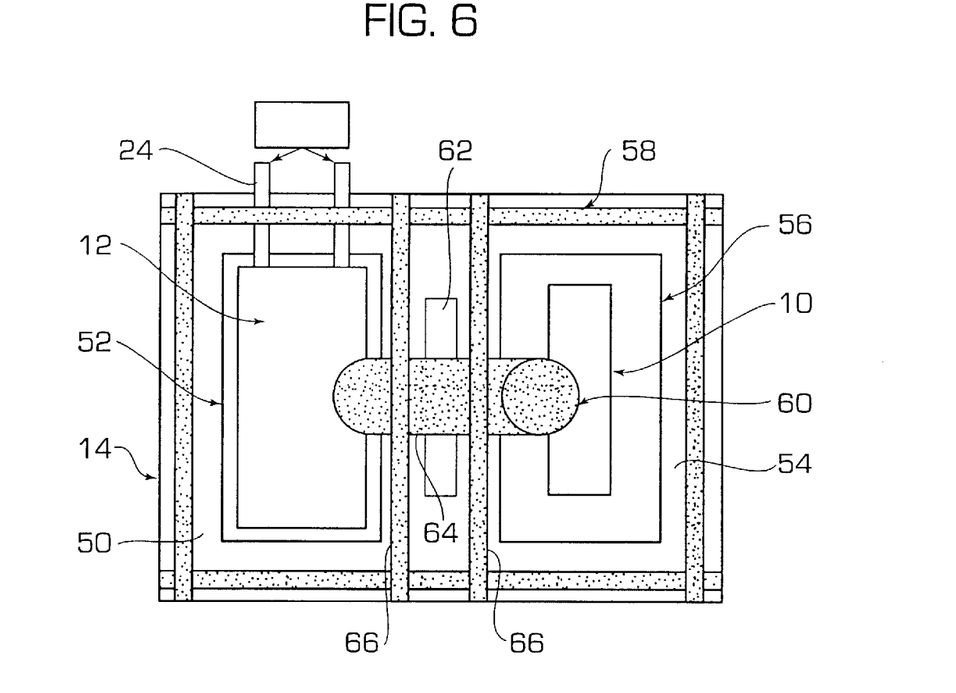
FIG. 6 is a plan view showing the cell package having a tube interconnecting the cell stack enclosure and the pouch enclosure, according to a second embodiment of the invention.
Figure 7:
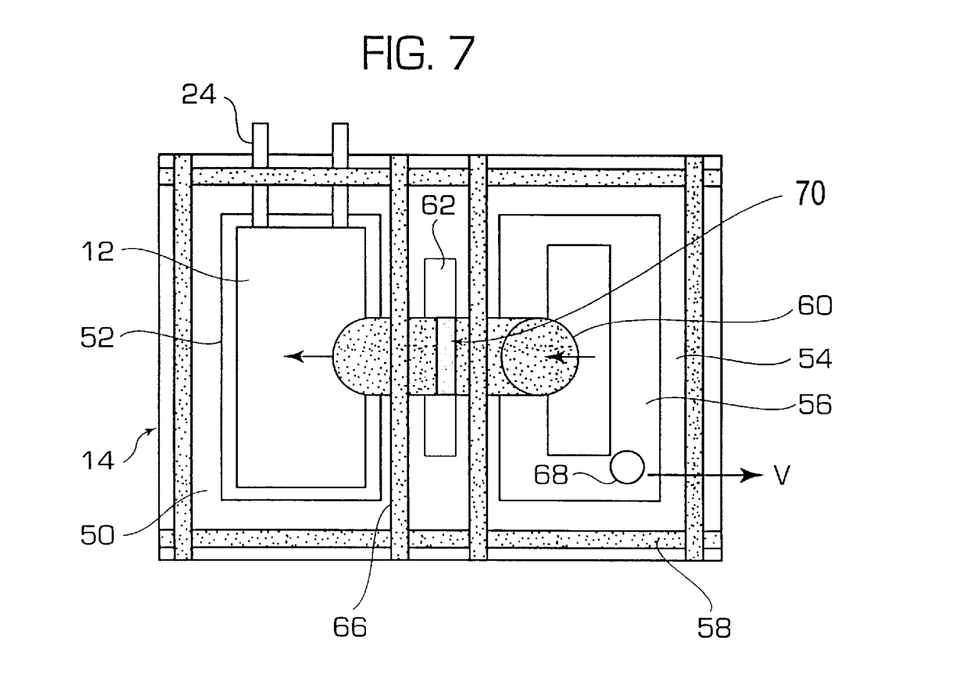
FIG. 7 is a plan view showing cell package of FIG. 6 with the tube sealed after the introduction of the electrolyte into the cell stack enclosure.

According to another embodiment of the invention, a method is used which does not require the sealing of the cell package after it becomes contaminated. This method will be described in detail with reference to FIGS. 6–9. According to this aspect of the invention, the cell package 14 is formed so that it includes two enclosure that are separated from each other. A first enclosure 50 has a cell stack cup 52 which is sized to receive the cell stack 12 and the second enclosure 54 has a pouch cup 56 which is sized to receive the electrolyte pouch 10, discussed above. The cell package 14 is vacuum heat sealed along seams 58, as shown in FIGS. 6 and 7 and discussed further below, so as to form the two enclosures. A tube 60 is provided inside the cell package 14 so that one end communicates with the cell stack cup 52 and the other end communicates with the pouch cup 56. As a result, the two cups are in fluid communication with each other. A window 62 is provided in the cell package 14 between the two enclosures such that a portion 64 of the tube is exposed to the outside of the cell package to allow the tube to be ultra-sonically welded without interfering with the package.

In the illustrated embodiment, the cell package 14 is formed from two sheets of packaging material that are heat sealed together along the seams 58 in a conventional manner. Prior to sealing the transverse seams 66, the tube is positioned between the sheets with respective ends in communication with the cell stack cup 52 and the pouch cup 56. Thereafter, the package is heat sealed to form the transverse seams. It is noted that the tube 60 is made of an annealed metal, preferably nickel, copper, aluminum or any other material that is electrochemically compatible and weldable. Further, it is preferable that the tube be no thicker than the leads. The tube can be circular, oval or the like. Since the tube is made of metal, as discussed below, the heat sealing of the cell package does not cause the tube to be sealed.

As shown in FIG. 6, the cell stack 12 is provided in the cell stack cup 52 such that its leads extend to the exterior of the cell package 14. Thus, the cell package 14 is sealed around the leads 24 and evacuated, as discussed above. Similarly, the electrolyte pouch is provided in the pouch cup 56 in the second enclosure 54 and the second enclosure is evacuated. As with the previous embodiment, the cell package 14 is completely sealed without the presence of free electrolyte. Therefore, the cell package is not contaminated with the electrolyte when it is sealed.

After the cell package 14 has been sealed and the two enclosures 50, 54 have been evacuated, the electrolyte pouch is then ruptured in the manner discussed above. Thus, the electrolyte is released from the pouch 10, flows through the tube 60, and becomes impregnated in the cell stack 12 to thereby activate the cell.

The cell stack 14 is then subjected to formation which causes gases to develop inside the first and second enclosures 50, 54 and the cell stack cup 52 and pouch cup 56, which communicate with each other. To degas the enclosures, the second enclosure 54 containing the burst electrolyte pouch is punctured to form hole 68 and evacuated by drawing a vacuum as designated by arrow V in FIG. 7. Thus, the electrolyte gasses are evacuated from the enclosures. After degassing, the tube is sealed at seam 70 in the window 62. Preferably, the tube 60 is ultra-sonically welded so that contaminants are removed from the weld area. Of course, the invention is not to be limited in this respect, it being understood that any convention welding technique would suffice.

Figure 8:
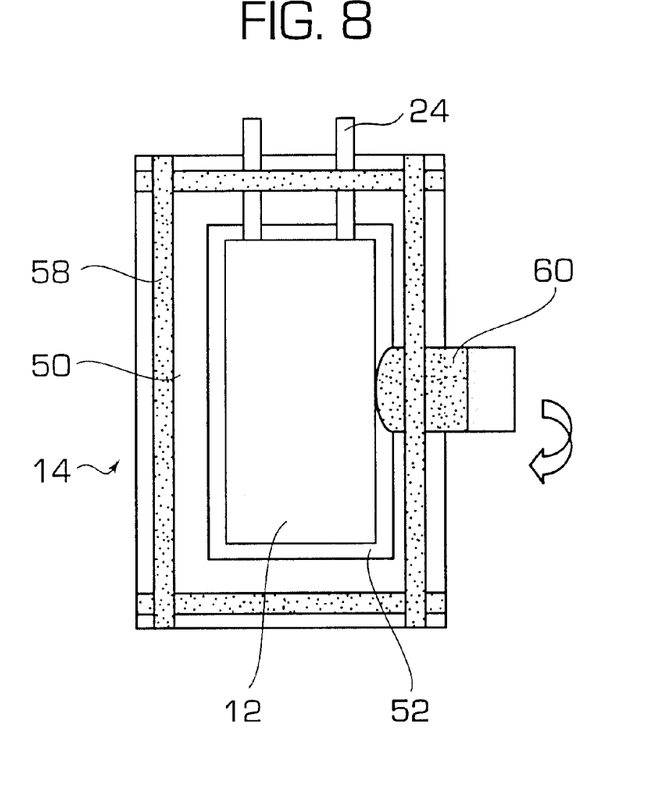
FIG. 8 is a plan view showing the cell package of FIG. 6 with the pouch enclosure portion having been removed.

Referring to FIG. 8, after degassing, the cell package is trimmed to remove the second enclosure portion. The tube 60 is then folded back over the side of the cell package 14 so that it does not protrude from the package.

Figure 9:
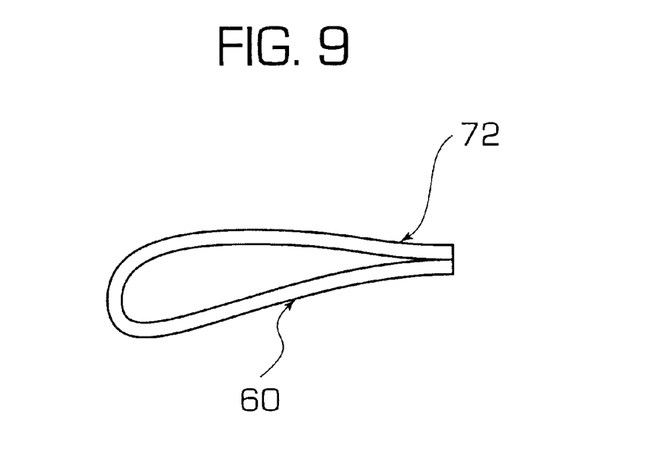
FIG. 9 is a side elevational view showing the tube.

FIG. 9 illustrates one technique for forming the tube 60. As noted above, the tube 60 is formed by a thin metallic sheet. The sheet is folded such that the inside surfaces of the sheet contact each other and are welded together at weld area 72. Although a description has been provided of one technique for forming the tube, it is understood that the invention is not limited to this arrangement. For example, the tube could be formed by injection molding or the like so that it is seamless, much like a hollow needle.

Figure 10:
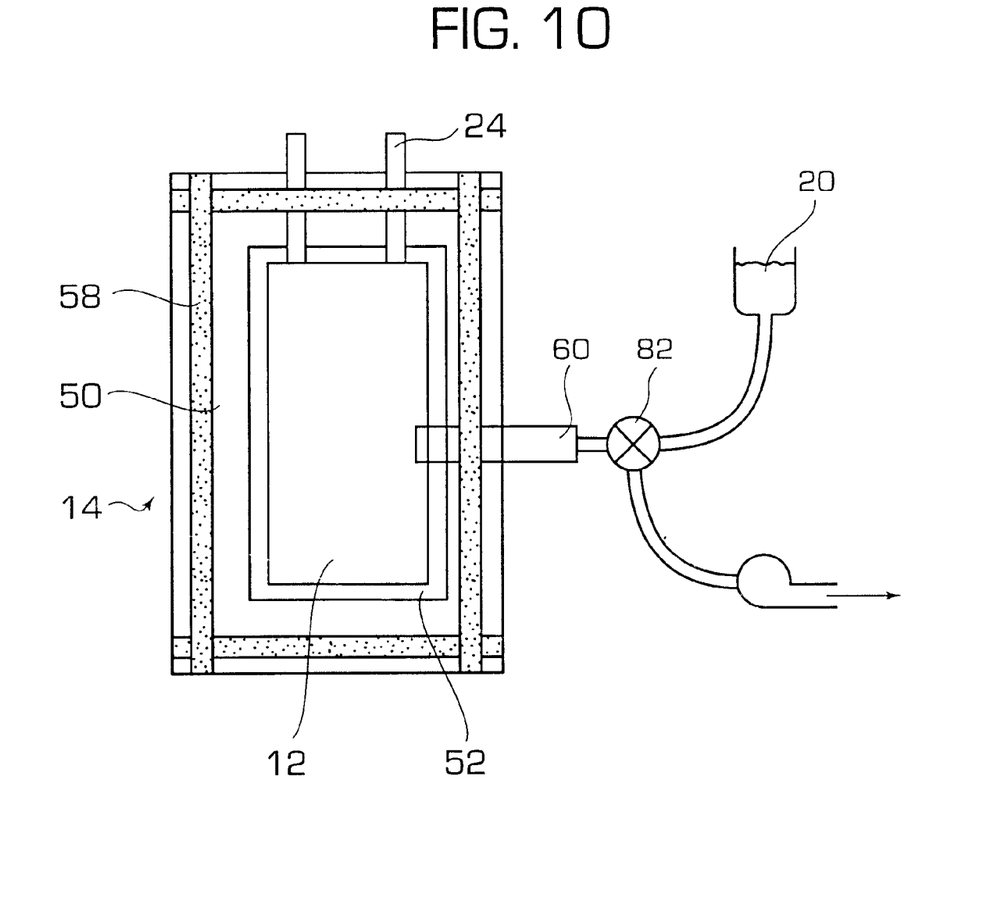
FIG. 10 is a plan view showing the cell package where the tube is connected to an external electrolyte source, according to another embodiment of the invention.

The following is a description of yet another embodiment of the invention illustrated in FIG. 10. Instead of providing two enclosures in the cell package, it is possible to provide just a single enclosure 50 for receiving the cell stack 14 and supply the electrolyte from an external source through the tube 60 which communicates with the single enclosure 50. In more detail, according to this aspect of the invention, one end of the tube extends into the cell stack cup 52 in the first enclosure 50 and the other end of the tube 60 extends outside the cell package so as to be exposed. The exposed end of the tube 60 may then be connected to an electrolyte reservoir 80 via a three-way pump 82 which allows the enclosure to first be evacuated and then filled with the electrolyte. After the enclosure is filled, the tube is sealed and the cell is then subjected to formation. After formation, the tube is cut to allow for degassing by drawing a vacuum through the tube. After degassing, the tube is US welded a second time. The tube is then folded over the cell package.

Figure 12:
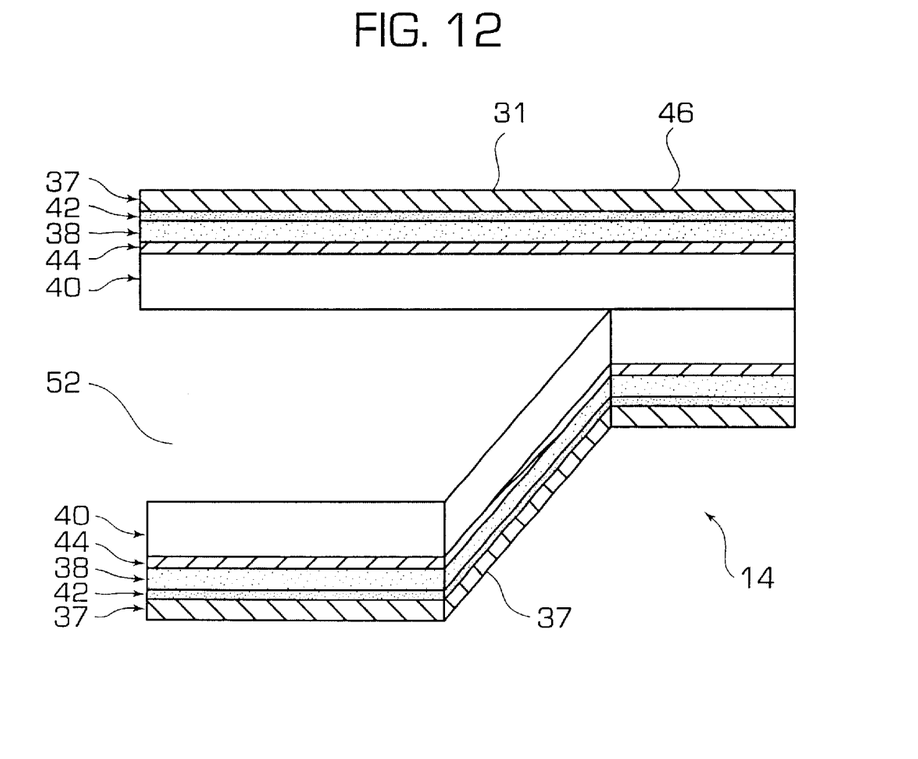
FIG. 12 is an exploded sectional view showing the sealed portion of the cell package.

FIGS. 11 and 12 show the construction of the preferred cell package 14, although the above methods are not limited to the use of this particular package. One of the sheets 31 has a cavity corresponding to the cell stack cup 52. The material of the sheets 31 includes a polyester layer 37, an Al (Aluminum) foil layer 38 and a polypropylene heat seal layer 40. The polyester layer 37 is adhered to the Al foil layer 38 by adhesive 42 and the heat seal layer 40 is adhered to the Al foil layer using thermoset adhesive 44. The polyester layer 37 provides mechanical strength, the Al foil layer 38 acts as a moisture barrier to prevent moisture from entering into the cell package and the heat seal layer 40 seals the cell package.

The thickness of the heat seal layer is between $25\mu$ and $100\mu$, and preferably between $50\mu$ and $75\mu$. The primary purpose of the heat seal layer is to seal the cell package after the electrolyte has been impregnated into the cell stack 12. Polypropylene has a good compatibility with the electrolyte so that it can be heat sealed even when the cell package is contaminated with the electrolyte.

Referring to FIG. 12 showing the heat sealed edge 46 of the cell package, the edge does not have an Al foil layer 38 to act as a barrier. Thus, it is important that the heat seal layer 40 have low permeability for both water and the electrolyte to ensure a long shelf life. Because of the non-polar nature of polypropylene it has a lower moisture permeability than the polyethylene, polyethylene acrylic acid (EAA) and Surlyn™, which, as discussed above, are current packaging materials for lithium polymer batteries. Also, polypropylene is more resistant to organic solvents than these materials.

Potential disadvantages associated with polypropylene is that is has a higher sealing temperature than the conventional materials (approximately 140° C. v. 100–120° C.) and cannot be sealed directly to the metal leads of the battery. The former problem can be addressed by using packaging equipment that is capable of heat sealing at this higher temperature. The latter problem can be overcome by coating the leads 24 with a suitable hotmelt EAA glue or EAA film in advance.

Any convention adhesive can be used as the adhesive 42, i.e., aqueous or solvent based adhesive. On the other hand, the adhesive 44 is preferably a thermoset polyurethane adhesive or an organosol type modified polypropylene dispersion adhesive (MORPRIME® 10B), both available from Morton International, Inc. These adhesives are advantageous in that they will not break down in the event the electrolyte penetrates through the polypropylene heat seal layer 40 during extended use or storage of the battery. A conventional water or solvent based adhesive can be attacked by the electrolyte.

The following test results demonstrate the improved strength associated with these adhesives 44. Specifically, a test was conducted to compare the seal strength of the cell package of the present invention (in both the uncontaminated state and the contaminated state) with the current cell package.

| Conventional packaging material | |
| --- | --- |
| Polyester | 23 μm (outer layer) |
| Adhesive layer | aqueous or solvent based |
| Aluminum foil layer | 20 μm |
| Adhesive layer | aqueous or solvent based |
| Low density PE/Surlyn ® | 70 μm (Heat seal layer) |
| Packaging material according to invention: | |
| Polyester layer | 12 μm (outer layer) |
| Adhesive layer | aqueous or solvent based adhesive, or thermoset |
| Aluminum foil layer | 13 μm |
| Adhesive layer | thermoset polyurethane |
| Polypropylene | 100 μm (heat-seal layer) |

Strips were cut of each packaging material and they were heat sealed together to form pouches. A first group of pouches were filled with organic electrolyte composed of a mixture of dimethylcarbonate, diethylcarbonate, ethylenecarbonate, and $LiPF_6$. They were subsequent stored for 4 days at 60° C. 20 mm strips were then cut from the pouches so the heat seal area was in one end. The two pieces of packaging material, which previously made up the sides of the pouch were then pulled apart at a 180° angle, and the force and failure mechanism were determined. A second group of pouches were subjected to the tension test without being contaminated.

In all cases the failure mode was delamination of the heat seal layer from the Aluminum foil, so the test showed the quality of the adhesive bonding those two layers together. The test results are shown in the following table.

| Seal strength of 20 mm wide strips | | | |
| --- | --- | --- | --- |
| No Electrolyte Contamination | | After 4 days @ 60° C. with Electrolyte | |
| Conventional Packaging | Package of Invention | Conventional Packaging | Package of Invention |
| Tensile strength 3.9 kg | 9.1 kg | 0.0 kg | 4.7 kg |
| 3.2 kg | 10.2 kg | 0.0 kg | 5.2 kg |
| 4.3 kg | 10.9 kg | 1.1 kg | |
| | 9.5 kg | 2.1 kg | |
| Average 3.8 kg | 9.9 kg | 0.8 kg | 5.0 kg |

The conventional packaging used a aqueous based adhesive The package of this invention used a thermoset polyurethane based adhesive As is apparent, the cell package material of the present invention provides superior strength as compared to the conventional cell package, both when contaminated with electrolyte and when uncontaminated.

The Al foil layer should be thick enough to avoid pinholes, preferably in the range of 25μ to 75μ. In the event that the cell package must be preformed, a formable grade Al foil should be used.

As noted above, the outer polyester layer 37 is designed to provide mechanical strength to the cell package 14. It should be understood that the invention is not limited to the use of polyester for this layer. For example, a laminate of PET and PE could be used as an alternative.

The methods of the present invention provides the following important advantages. First, since the cell stack is sealed at the time that the pouch is ruptured, there is minimal loss of electrolyte. Also, there is no contamination of the equipment. Further, since the cell package is evacuated prior to the rupturing of the electrolyte pouch, electrolyte loss is further eliminate as it will not be suctioned from the cell stack. Further, the only step that must be performed in a glove box (i.e., a dry and inert atmosphere) is the filling of the pouch with electrolyte and the subsequent sealing of the pouch. The remaining assembly process steps can be performed in a dry room. Therefore, the equipment used for manufacturing the cell stack is less costly. Further, since the vacuum is applied to the package cell under the condition that the pouch is sealed inside the package, a higher vacuum pressure can be applied to ensure deep impregnation of the electrolyte into the cell stack without risking loss of electrolyte.

In addition, the cell package construction with the polypropylene heat sealing layer and the special adhesive enables the cell package to be heat sealed after the impregnation of the electrolyte, using the first method described above, and retains its integrity even when contaminated by electrolyte. Therefore, additional steps associated with transferring the electrode stack to another, uncontaminated cell package can be eliminated.

Further, using the tube technique for filling the cell stack with the electrolyte eliminates altogether the need for heat sealing a contaminated cell package.

The foregoing detailed description is illustrative of the invention, and it is to be understood that additional embodiments thereof will be obvious to those skilled in the art. The embodiments disclosed herein together with those additional embodiments are considered to be within the scope of the invention as described in the claims appended hereto.

What is claimed is:

1. An electrochemical cell comprising:

a casing; and an electrode cell stack contained within said casing along with an electrolyte, wherein said casing includes first and second parts each comprising a laminate having an outer layer, an inner layer and a barrier layer interposed between said inner and outer layers, said first and second parts having their inner layers adhered to one another, said inner layer being a polypropylene layer, wherein said inner layer and said barrier layer are adhered together with an adhesive, said adhesive being an organosol type modified polypropylene dispersion adhesive.

2. The electrochemical cell of claim 1, wherein said outer layer is a polyester layer and said barrier layer is an aluminum layer.

3. The electrochemical cell of claim 1, wherein said polypropylene inner layers are heat sealed to each other.

4. The electrochemical cell of claim 2, wherein said polypropylene inner layers are heat sealed to each other.

5. The electrochemical cell of claim 1, wherein said first and second parts are unitary with each other.

6. The electrochemical cell of claim 1, wherein said first and second parts are initially independent of each other and are heat sealed to each other around the entire periphery thereof.

7. The electrochemical cell of claim 4, wherein said casing initially includes a first portion in which said cell stack is located and a removable second portion in which an electrolyte pouch is receivable for impregnating said electrodes with said electrolyte upon the bursting of said pouch.

* * * * *